(12) United States Patent
Chan et al.

(10) Patent No.: US 9,235,013 B1
(45) Date of Patent: Jan. 12, 2016

(54) LOW-PROFILE OPTICAL TRANSCEIVER CONNECTOR RECEPTACLE

(71) Applicant: Avago Technologies General IP (Singapore) Pte. Ltd., Singapore (SG)

(72) Inventors: Seng-Kum Chan, Santa Clara, CA (US); Chaitanya Arekar, Dublin, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 28 days.

(21) Appl. No.: 14/333,351

(22) Filed: Jul. 16, 2014

(51) Int. Cl.
*G02B 6/36* (2006.01)
*G02B 6/42* (2006.01)
*G02B 6/43* (2006.01)

(52) U.S. Cl.
CPC .............. *G02B 6/423* (2013.01); *G02B 6/4256* (2013.01); *G02B 6/4284* (2013.01); *G02B 6/4292* (2013.01); *G02B 6/43* (2013.01)

(58) Field of Classification Search
CPC combination set(s) only.
See application file for complete search history.

(56) References Cited

U.S. PATENT DOCUMENTS 6,485,189 B1 * 11/2002 Gilliland .............. G02B 6/3878
385/59
7,674,046 B2 * 3/2010 Milette ................ G02B 6/3831
385/53
2008/0145003 A1 * 6/2008 Ice ....................... G02B 6/4292
385/92
2014/0133807 A1 5/2014 Katoh

FOREIGN PATENT DOCUMENTS

WO 2014074931 A1 5/2014

OTHER PUBLICATIONS

Rear Pivot Latch LC Connector. White Paper [online]. Panduit Corp., Nov. 2003 [retrieved on Jun. 16, 2014]. Retrieved from the Internet: <http://www.panduit.com/heiler/WhitePapers/LC%20White%20Paper.pdf>.

* cited by examiner

*Primary Examiner* — Hemang Sanghavi

(57) ABSTRACT

An optical communications module includes a receptacle with a stop member. The receptacle has a keyway and a latchway. The keyway is configured to receive and guide a body of the connector plug in a direction along a keyway axis. The latchway is defined by a total flexure range of the flexible latch arm between a fully flexed state and a fully relaxed state. The latchway is configured to receive and guide the flexible latch arm through a range of movement having a directional component perpendicular to the keyway axis. The stop member extends from a wall of the receptacle into the latchway. The stop member is configured to restrain the flexible latch arm in a latched state between the fully flexed state and the fully relaxed state.

20 Claims, 9 Drawing Sheets

LOW-PROFILE OPTICAL TRANSCEIVER CONNECTOR RECEPTACLE

BACKGROUND

Optical data transceiver modules convert optical signals received via an optical fiber into electrical signals, and convert electrical signals into optical signals for transmission via an optical fiber. In the transmitter portion of a transceiver module, an opto-electronic light source such as a laser performs the electrical-to-optical signal conversion. In the receiver portion of the transceiver module, an opto-electronic light detector such as a photodiode performs the optical-to-electrical signal conversion. A transceiver module commonly also includes optical elements or optics, such as lenses, as well as electrical circuitry such as drivers and receivers. A transceiver module also includes one or more connector receptacles to which an optical fiber cable can be connected. The light source, light detector, optical elements and electrical circuitry can be mounted within a module housing.

Various transceiver module configurations are known. One family of transceiver module configuration is known as Small Form Factor Pluggable (SFP) and includes variations such as SFP+, Quad SFP (QSFP), etc. Such SFP-family transceiver modules include an elongated housing having a substantially rectangular cross-sectional shape, i.e., a bar shape. A forward end of the housing, sometimes referred to as the nose, has one or more receptacles into which optical fiber connectors can be plugged. A rearward end of the housing has an array of electrical contacts that can be plugged into a mating connector when the rearward end is inserted or plugged into a slot of a network switch or other device.

A common type of optical fiber connector is known as LC. As illustrated in FIG. 1, an LC plug 10 has a flexible latch arm 12 and a plug body 14. An end of latch arm 12 joins a sidewall of plug body 14 to form a hinge-like, bendable or resiliently flexible joint. Substantially at this joint, latch arm 12 can resiliently flex about an axis 16. Latch arm 12 is made of a material such as resilient plastic to facilitate such flexure. As further illustrated in FIG. 2, in response to a force having a component generally in the direction indicated by the arrow 18, latch arm 12 can be flexed from a relaxed or unflexed state shown in solid line to a fully flexed state shown in broken line. The force thus loads latch arm 12 with a return spring force or resilient bias force. When the force is removed, the spring force or resilient bias force returns latch arm 12 to the relaxed state. In the relaxed state, the angle 20 between a centerline 22 of latch arm 12 and a central axis 24 of LC plug 10 is commonly between about 15 and 25 degrees, and latch arm 12 can be flexed to essentially any angle within that range.

As illustrated in FIG. 3, LC plug 10 terminates the end of a fiber-optic cable 26. LC plug 10 can be plugged into a receptacle in a nose 28 of an optical transceiver module 30. For illustrative purposes, optical transceiver module 30 has a QSFP configuration. A region 32 of FIG. 3 is shown enlarged in FIG. 4 to more clearly illustrate the manner in which LC plug 10 engages nose 28 in a pluggable and latchable manner. As LC plug 10 is inserted into the receptacle, interior surfaces of the receptacle (not shown in FIGS. 3-4) receive and guide plug body 14 (FIGS. 1-2), and a slot in a wall 31 of the receptacle receives and guides portions of latch arm 12. Also, as LC plug 10 is inserted into the receptacle, a ramp portion 29 of latch arm 12 slides against an interior surface of wall 31, thereby initially applying the above-referenced force indicated by arrow 18 in FIG. 1. In response to this force, latch arm 12 flexes in the manner described above.

Latch arm 12 has two projections or blocks 34 and 36 located approximately mid-way along the length of latch arm 12 at the end of ramp portion 29. The effect of blocks 34 and 36 bearing against the interior surface of wall 31 while LC plug 10 is being inserted restrains latch arm 12 in a partly flexed state.

As LC plug 10 is still further inserted into the receptacle in nose 28, blocks 34 and 36 slide over an edge of wall 31 defined by two faces or catches 38 and 40. An end of the above-referenced slot in wall 31 is between catches 38 and 40. As blocks 34 and 36 slide over the end of the slot and no longer bear against the interior surface of wall 31, latch arm 12 is released from restraint. The spring force flexes latch arm 12 into the fully relaxed state. As latch arm 12 flexes into the fully relaxed state, blocks 34 and 36 snap into a latched position against catches 38 and 40. This latching engagement, in which blocks 34 and 36 bear against catches 38 and 40, resists LC plug 10 from being withdrawn from the receptacle. To disengage or de-latch LC plug 10 from the receptacle, a person can apply the force described above with regard to FIG. 2 and withdraw (i.e., un-plug) LC plug 10 from the receptacle. Latch arm 12 has an actuator end 21 that is conveniently shaped for a person to apply the force with a finger.

Although for purposes of clarity only a single LC plug 10 is shown plugged into a single receptacle in nose 28, nose 28 includes four such receptacles (as the illustrated optical transceiver module 30 is of the QSFP type). The term "receptacle" refers to an interior region of nose 28 that interfaces with portions of LC plug 10. The receptacle is defined principally by two cavities or three-dimensional regions that can be referred to as a keyway and a latchway. In the illustrated nose 28, the keyway of each receptacle has a substantially square cross-sectional shape corresponding to the substantially square cross-sectional shape of plug body 14, so that plug body 14 is guided into the receptacle when LC plug 10 is inserted. The keyway thus extends in the direction in which LC plug 10 is inserted into the receptacle. The latchway extends laterally or transversely from the keyway and includes the above-referenced slot in wall 31. The latchway accommodates the flexure of latch arm 12. That is, latch arm 12 can move within the latchway as it flexes between the fully flexed state and fully relaxed state. In FIG. 4, latch arm 12 is shown in a fully relaxed state, extending through the latchway slot. Note that actuator end 21 of latch arm 12 extends outside the outline of the module housing.

SUMMARY

Embodiments of the present invention relate to an optical communications module housing for receiving an optical connector plug in a manner that restrains a flexible latch arm of the connector plug against reaching a fully relaxed state. In an exemplary embodiment, the module housing includes a receptacle with a stop member. The receptacle has a keyway and a latchway. The keyway is configured to receive and guide a body of the connector plug in a direction along a keyway axis. The latchway is defined by a total flexure range of the flexible latch arm between a fully flexed state and the fully relaxed state. The latchway is configured to receive and guide the flexible latch arm through a range of movement having a directional component perpendicular to the keyway axis. The stop member extends from a wall of the receptacle into the latchway. The stop member is configured to restrain the flexible latch arm in a latched state between the fully flexed state and the fully relaxed state. The connector plug resists removal from the receptacle when the flexible latch arm is in the latched state.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 5:
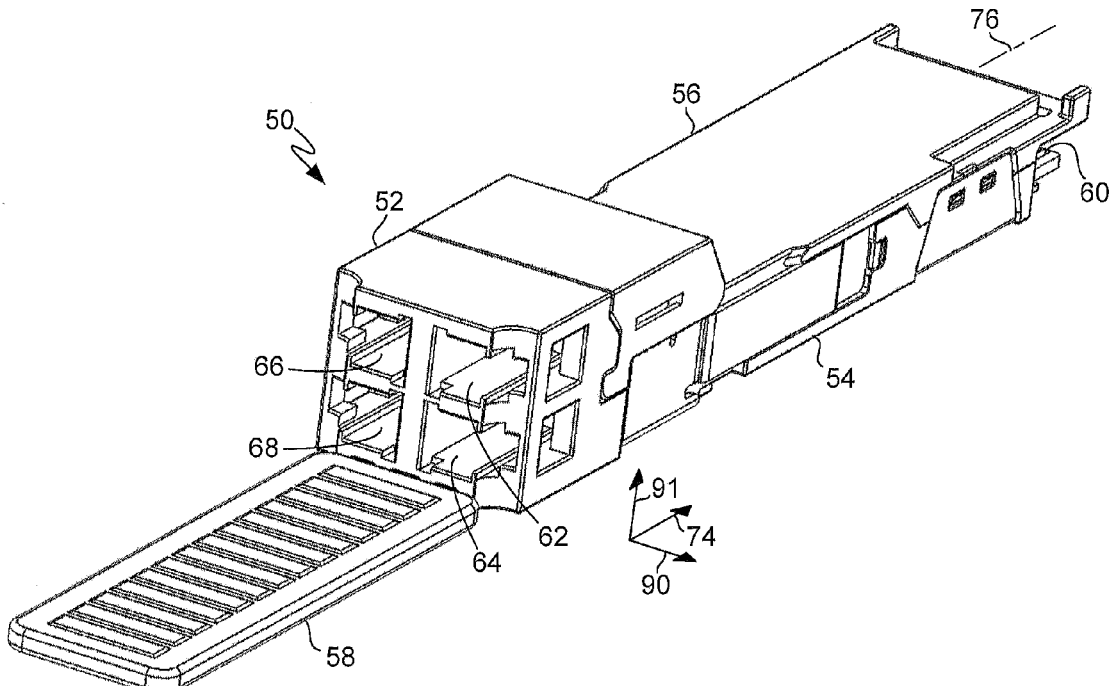
FIG. 5 is a perspective view of an optical transceiver module in accordance with an exemplary embodiment of the invention.

As illustrated in FIG. 5, in an illustrative or exemplary embodiment of the invention, an optical transceiver module 50 includes a nose 52, a lower housing portion 54, an upper housing portion 56, and a pull-tab 58. Lower and upper housing portions 54 and 56, respectively, extend substantially between a forward end and a rearward end of optical transceiver module 50. Nose 52 is located at the front or forward end of optical transceiver module 50 and can be made of, for example, cast metal. An array of electrical contacts 60 at the rearward end of optical transceiver module 50 can mate in a conventional manner with an electrical connector of an external system (not shown) into which optical transceiver module 50 can be plugged. Although not shown for purposes of clarity, in a transmitter portion of optical transceiver module 50, lasers convert electrical signals derived from those received via electrical contacts 60 into transmit-channel optical signals. Similarly, although not shown for purposes of clarity, in a receiver portion of optical transceiver module 50, photodiodes convert receive-channel optical signals into electrical signals that are output via electrical contacts 60. Conventional features of SFP-family modules, such as electronics, optics, pull-tab 58, etc., are not described herein in further detail, as they are well understood by persons skilled in the art.

In the exemplary embodiment, nose 52 has four receptacles 62, 64, 66, and 68, and in conjunction with the elongated housing shape and aforementioned pluggable electrical connection thus characterize optical transceiver module 50 as having a generally QSFP configuration. Nevertheless, in other embodiments an optical transceiver module in accordance with the present invention can have any other suitable configuration, such as, for example, another configuration in the SFP family, or a CFP, CFP2, CFP4, etc., configuration.

Figure 1:
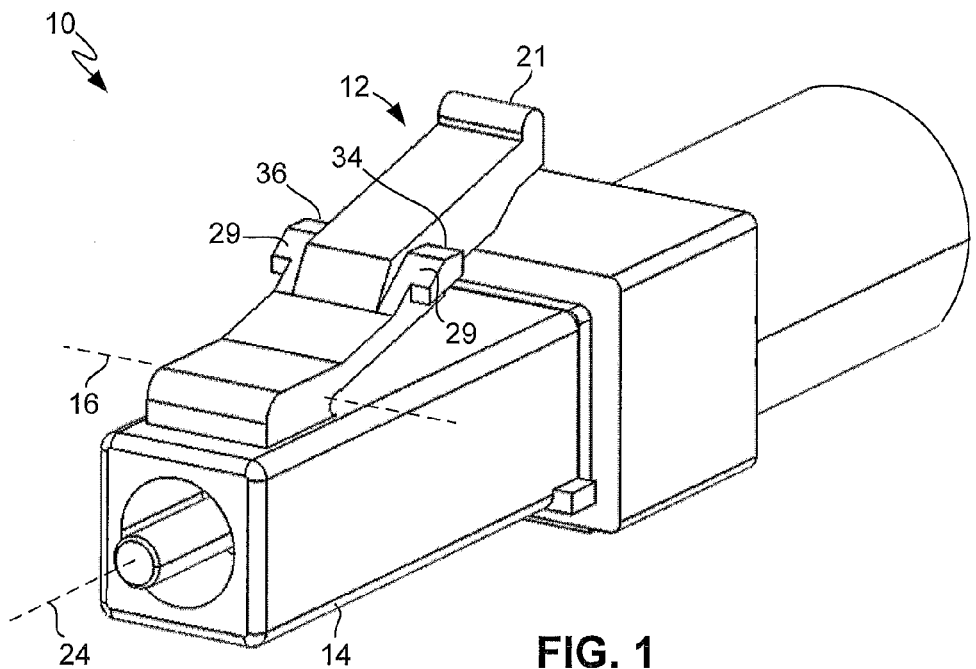
FIG. 1 is a perspective view of a conventional LC connector plug in accordance with the prior art.
Figure 2:
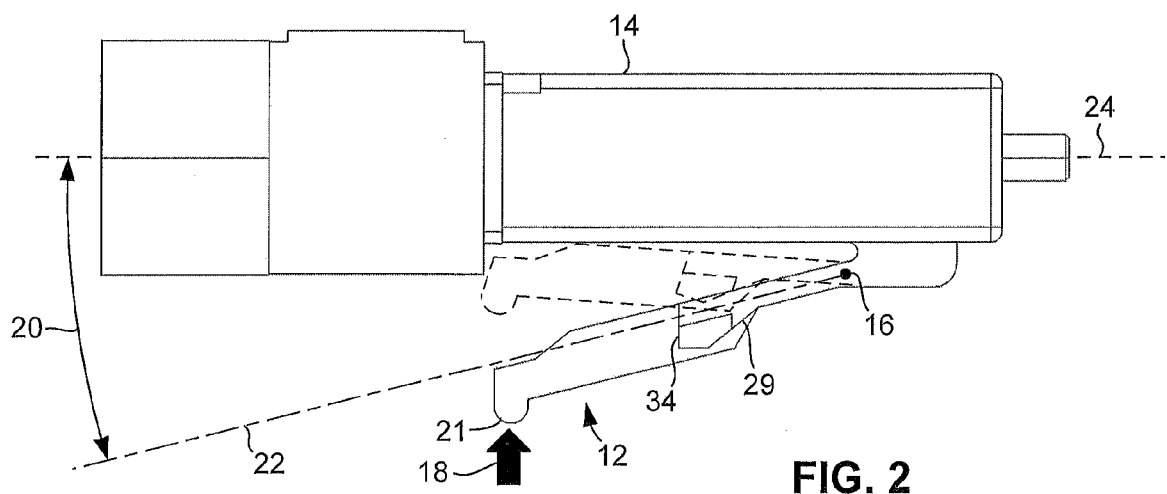
FIG. 2 is a side elevation view of the conventional LC connector plug of FIG. 1.
Figure 3:
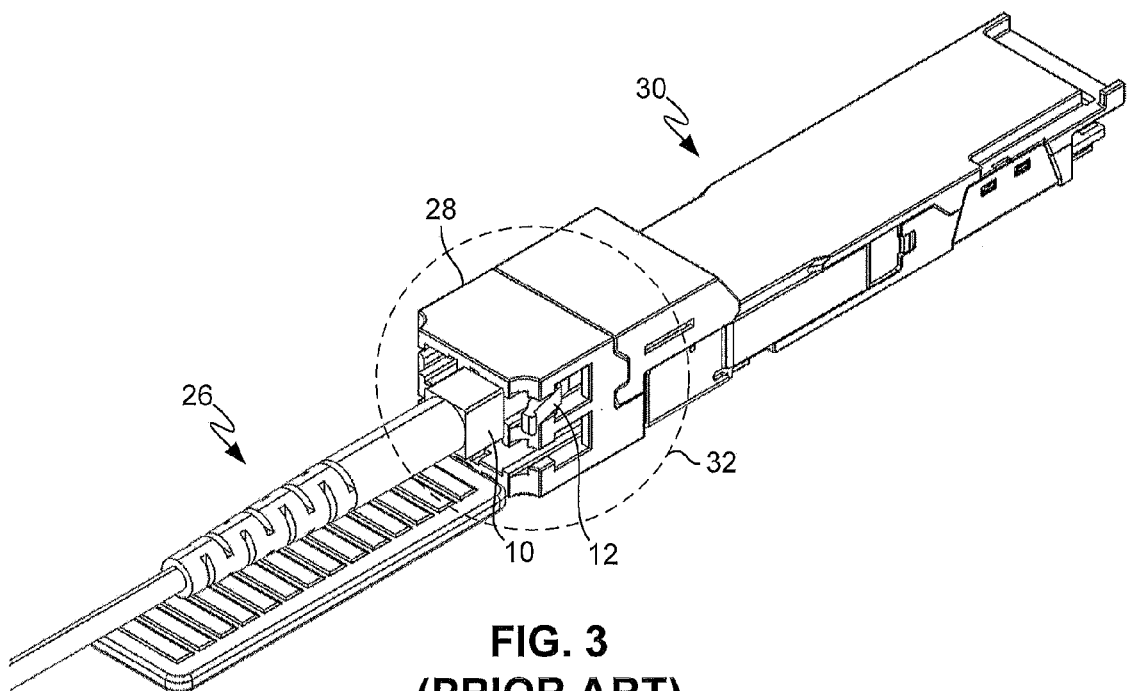
FIG. 3 is a perspective view of the conventional LC connector plug of FIGS. 1-2 plugged into a conventional optical transceiver module, in accordance with the prior art.
Figure 4:
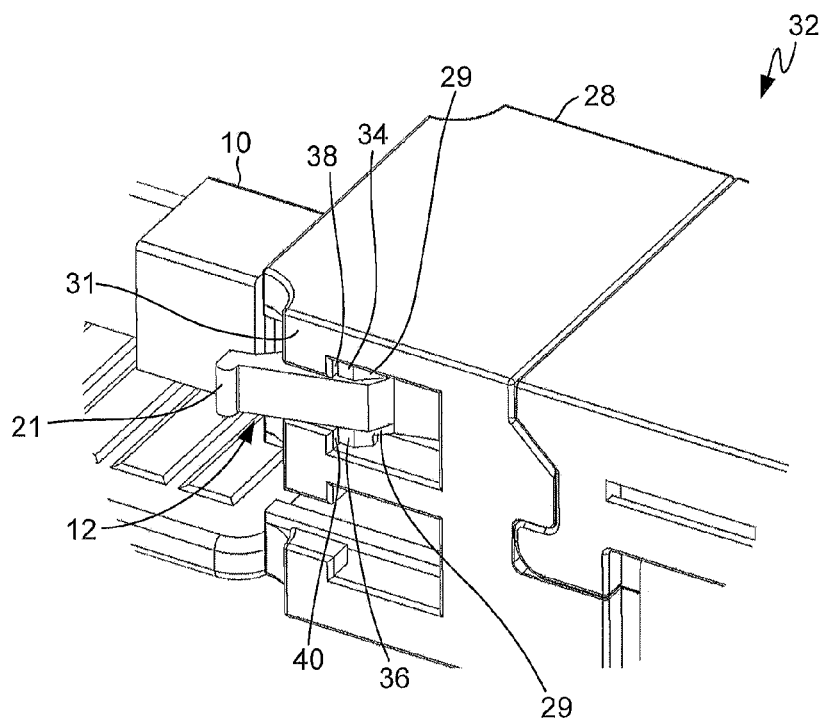
FIG. 4 is an enlargement of a region of FIG. 3.
Figure 6:
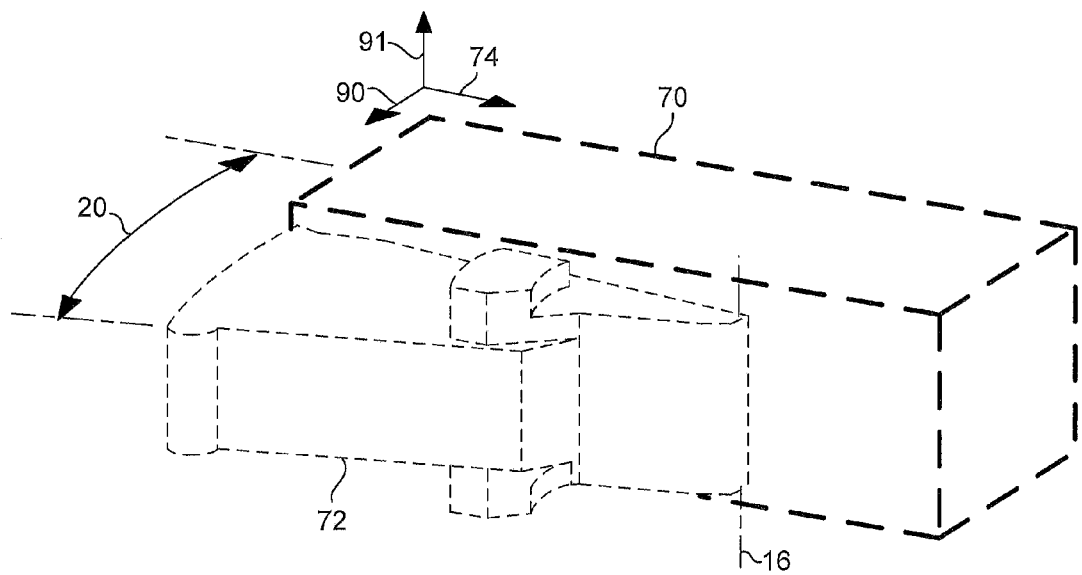
FIG. 6 is a perspective view of keyway and latchway regions of each receptacle of the optical transceiver module of FIG. 5.

Each of receptacles 62-68 can receive or be mated with the above-described conventional LC plug 10 (FIGS. 1-2). The above-referenced transmit-channel and receive-channel optical signals are respectively transmitted and received via one or more such LC plugs 10 that are plugged into receptacles 62-68. The term "receptacle" refers to an interior region of nose 52 that interfaces with portions of LC plug 10. As illustrated in FIG. 6, each of receptacles 62-68 can be defined principally by two cavities or three-dimensional regions that are referred to herein as a keyway 70 (indicated in heavy broken line) and a latchway 72 (indicated in lighter broken line).

Keyway 70 (and more generally, the term "keyway") is defined herein as the three-dimensional region defining a structure that guides plug body 14 (FIGS. 1-2) into the mated position. Accordingly, as plug body 14 is substantially bar-shaped (i.e., elongated in length) and square in cross-sectional profile, keyway 70 is correspondingly shaped and sized to receive plug body 14 in a sliding-fit manner. Keyway 70 has a length dimension or axis extending in the direction indicated by the arrow 74, which is the direction in which plug body 14 can be inserted in a sliding manner into one of receptacles 62-68. The direction indicated by arrow 74 is thus from the forward end toward the rearward end of optical transceiver module 50 and parallel to a longitudinal axis 76 (FIG. 5) of optical transceiver module 50. For convenience, longitudinal axis 76 can be referred to as indicating the "length" dimension of optical transceiver module 50.

Latchway 72 (and more generally, the term "latchway") is defined herein as the three-dimensional region that latch arm 12 can occupy, or be accommodated by, as latch arm 12 is moved or flexed between its fully relaxed state and its fully flexed state. Each point on the surface of latchway 72 can be occupied by a point on a surface of latch arm 12 when latch arm 12 is positioned accordingly, i.e., as latch arm 12 moves or travels throughout its the range of movement or travel. Stated another way, latchway 72 is defined by the total flexure range of latch arm 12, where the total flexure range ranges between the fully relaxed state and the fully flexed state. Note that the total flexure range and thus the shape of latchway 72 is defined in one respect by the angle 20 described above with regard to FIG. 2.

Figure 7:
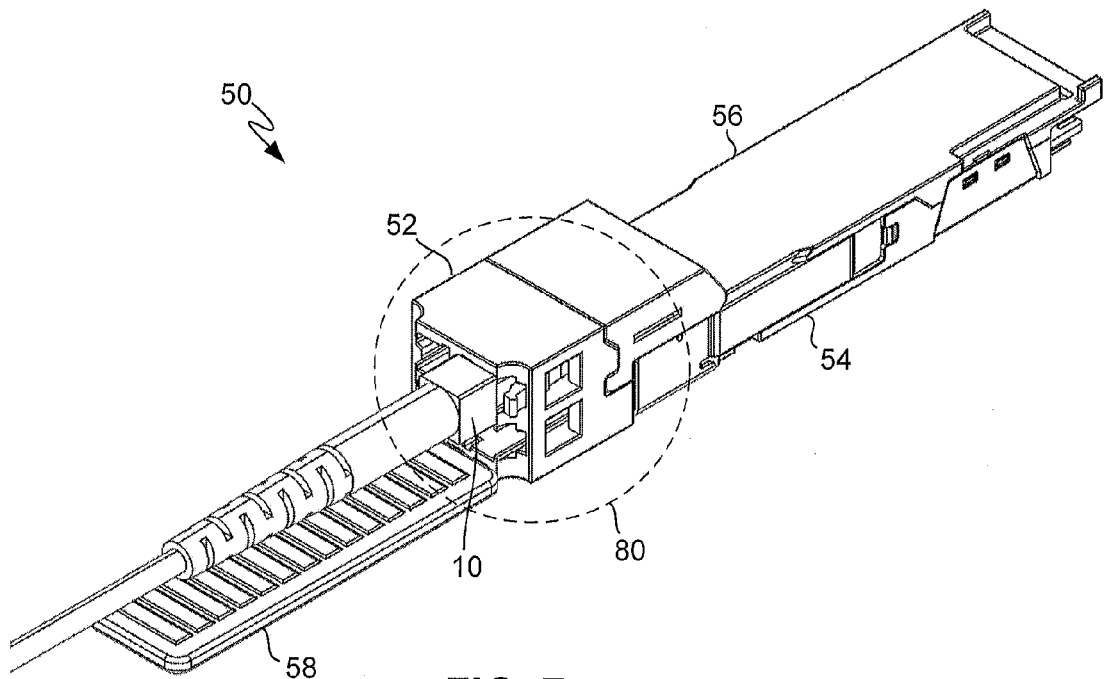
FIG. 7 is a perspective view of the LC connector plug of FIGS. 1-2 plugged into the optical transceiver module of FIG. 5, in accordance with an exemplary embodiment of the invention.

As illustrated in FIG. 7, LC plug 10 can be mated with any one of receptacles 62-68. Except as otherwise stated herein, LC plug 10 is receivable and latchable within any of receptacles 62-68 in the conventional manner described above with regard to FIGS. 1-4.

Figure 8:
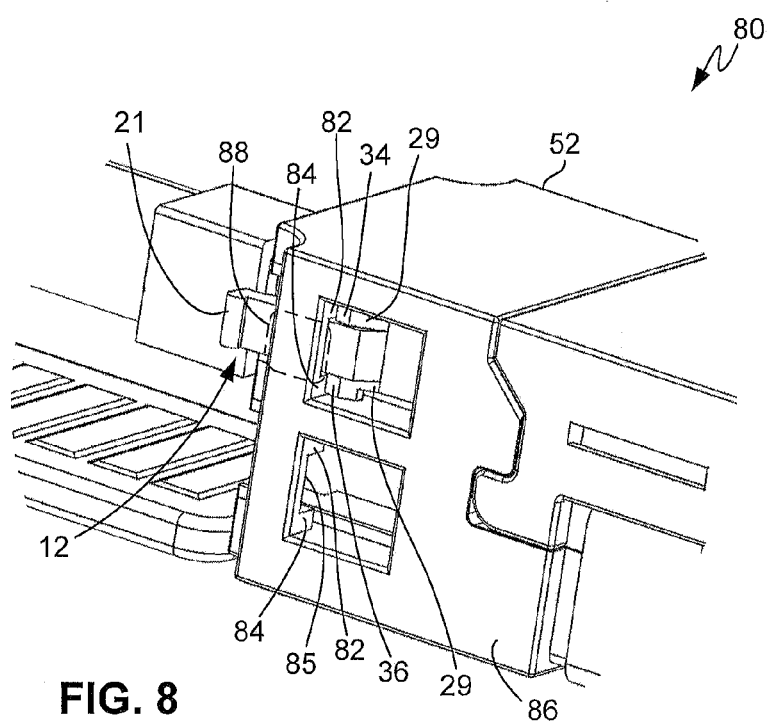
FIG. 8 is an enlargement of a region of FIG. 7.

A region 80 of FIG. 7 is shown enlarged in FIG. 8 to more clearly illustrate the manner in which LC plug 10 can be mated with, for example, receptacle 62. Although not shown for purposes of clarity, when LC plug 10 is mated with receptacle 62, plug body 14 of LC plug 10 is received in and guided by keyway 70 of receptacle 62 in the conventional manner. Also, portions of latch arm 12 are received in and guided by portions of latchway 72.

As illustrated in FIG. 8, when LC plug 10 is mated with one of receptacles 62-68, blocks 34 and 36 of latch arm 12 bear against respective catches 82 and 84. Note that a portion of latch arm 12 can flex or move into and out of a channel 85 having an end between catches 82 and 84. Channel 85 is thus included in latchway 72 (FIG. 6). Channel 85 is formed in the interior of a wall 86 of nose 52 and receives and guides a portion of latch arm 12 in a sliding manner when LC plug 10 is inserted. Note that as there are four receptacles 62-68 in the exemplary optical transceiver module 50, each of receptacles 62-68 includes a keyway 70, a latchway 72, a pair of catches 82 and 84, and a channel 85 having an end between catches 82 and 84.

Wall 86 includes a stop member 88 (encircled in broken line) that extends between catches 82 and 84. In other words, stop member 88 fills or occupies a portion of the region between catches 82 and 84. Stated yet another way, but for the presence of stop member 88, channel 85 would be a slot extending entirely through wall 86 (as in, for example, FIG. 4). Note that the portion of the region between catches 82 and 84 that is occupied by stop member 88 is included in latchway 72. The exterior surface of stop member 88, i.e., exterior to receptacle 62, is coextensive with the exterior surface of wall 86. The interior surface of stop member 88 defines a surface of channel 85. Note that as there are four receptacles 62-68 in the exemplary optical transceiver module 50, each of receptacles 62-68 includes such a stop member 88.

Referring briefly again to FIG. 6, another arrow 90 indicates a direction or axis perpendicular to the direction indicated by arrow 74. When latch arm 12 is in a flexed state, it experiences a spring bias force having a component in the direction indicated by arrow 90, thereby resiliently biasing latch arm 12 toward the fully relaxed state. However, (referring again to FIG. 8) the spring bias force urges latch arm 12 against stop member 88, which resists movement of arm 12 into the fully relaxed state. That is, stop member 88 stops latch arm 12 short of the fully relaxed state, restraining latch arm 12 in a state between fully flexed and fully relaxed, i.e., partly relaxed and partly flexed. Note that latch arm 12 moves or flexes through a range of movement having a directional component indicated by arrow 90. More generally, arrow 74 represents a direction or axis of keyway 70, while arrow 90 represents a direction or axis of latchway 72. For convenience, the direction or axis of latchway 72 can be referred to as indicating the "width" dimension of optical transceiver module 50. Another arrow 91 that is perpendicular to arrows 74 and 90 indicates a "height" dimension of optical transceiver module 50. It should be understood that the terms "length," "width" and "height" are used for convenience and not to relate such dimensions to anything else.

Figure 9:
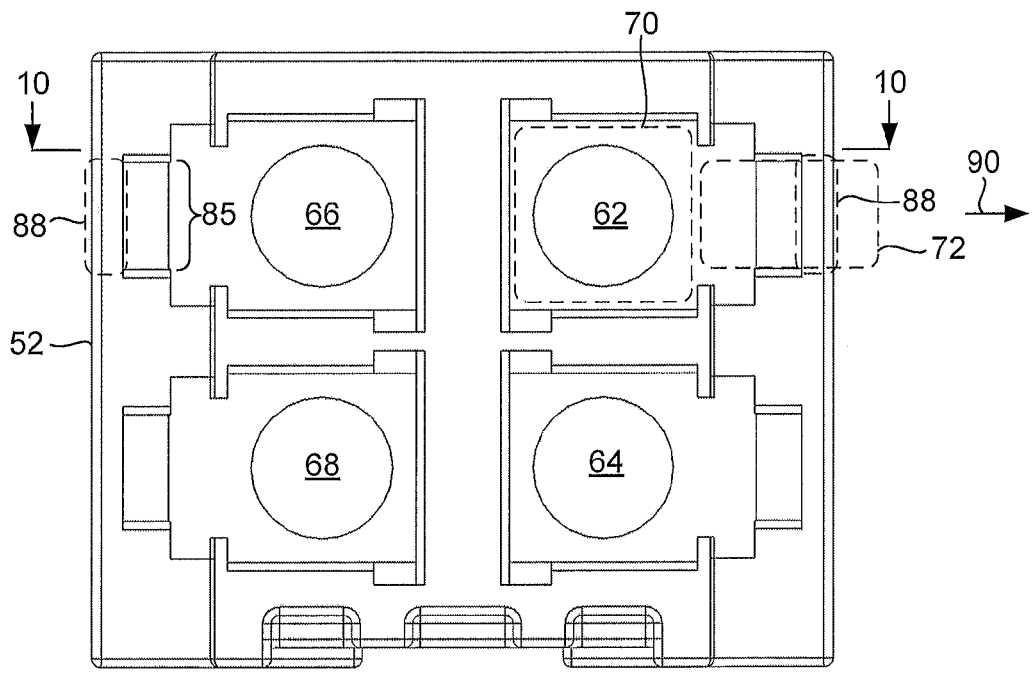
FIG. 9 is a front elevation view of the optical transceiver module of FIG. 5, with the upper housing cover and interior electronic and optical elements removed for clarity.
Figure 13:
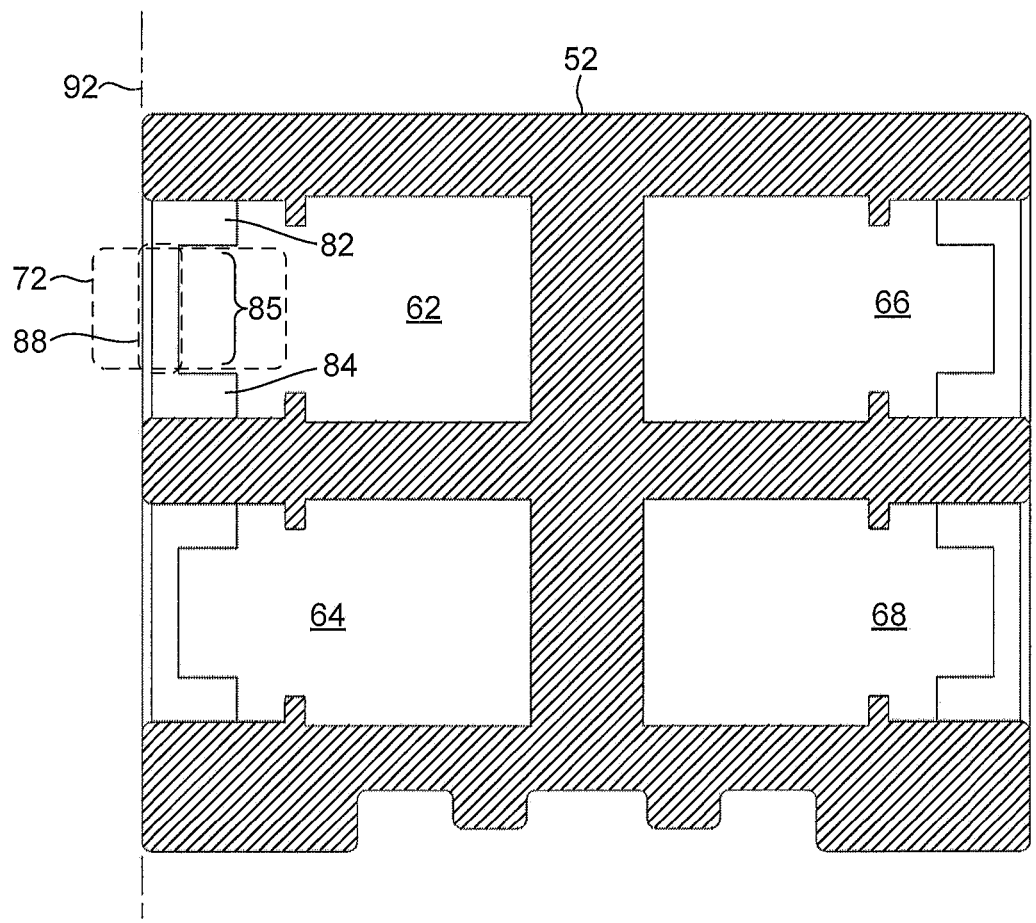
FIG. 13 is a sectional view taken on line 13-13 of FIG. 11.

With further reference to FIGS. 9 and 13, it should be noted that stop member 88 is located within or extends into latchway 72. Indeed, in the exemplary embodiment stop member 88 not only extends into or intersects latchway 72 but extends fully through latchway 72. Catches 82 and 84 (FIGS. 8 and 13) do not extend into latchway 72, as they are separated by channel 85. The term "catch" as defined herein refers to the portion of an optical transceiver module that engages blocks 34 and 36 of LC plug 10 or engages similar portions of a similar type of optical fiber plug to latch the plug to the optical transceiver module. But for stop member 88, no portion of nose 52 extends into latchway 72 in the exemplary embodiment. In other embodiments (not shown), any suitable portion of an optical transceiver module nose can serve as a stop member by extending into a latchway in any suitable manner that restrains a flexible latch arm against reaching a fully relaxed state. It should be noted that in other embodiments (not shown) a stop member may not necessarily extend fully through the latchway but rather can extend or project only partly into the latchway to an extent that it sufficiently interferes with the movement of the latch arm to restrain the latch arm.

Figure 10:
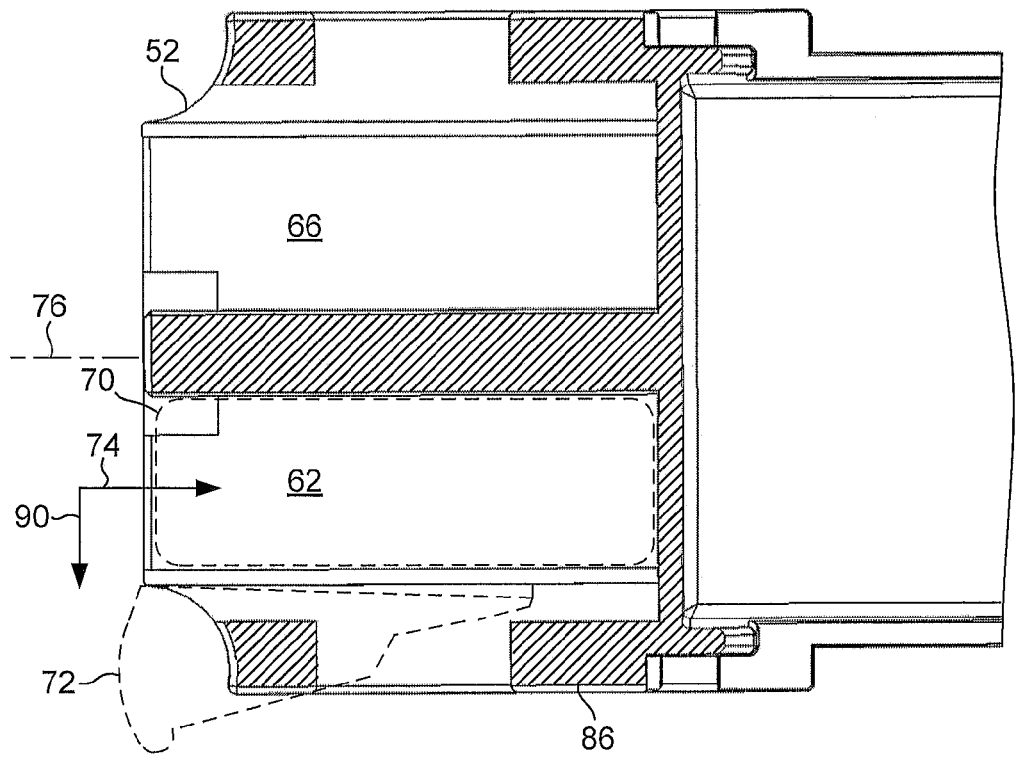
FIG. 10 is a sectional view of the module nose taken on line 10-10 of FIG. 9.

The manner by which each of receptacles 62-68 is defined by keyway 70 and latchway 72 is further illustrated in FIG. 10 with respect to receptacle 62 as an example. Note that latchway 72 extends laterally from keyway 70, i.e., extends in the direction indicated by arrow 90 with respect to arrow 74.

Figure 11:
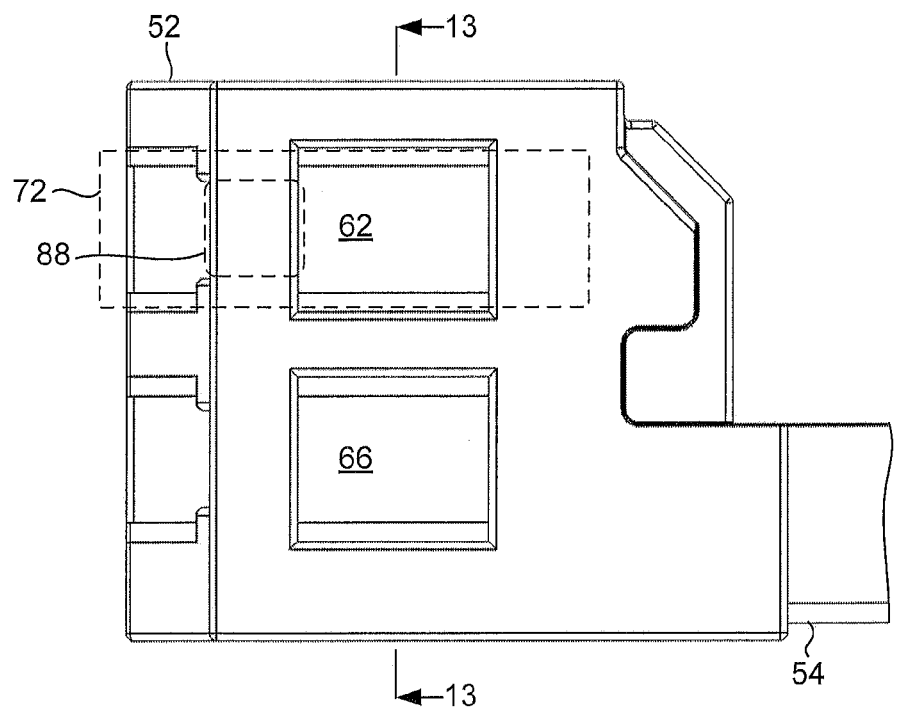
FIG. 11 is a side elevation view of the module nose of the optical transceiver module of FIG. 5, with the upper housing cover and interior electronic and optical elements removed for clarity.
Figure 12:
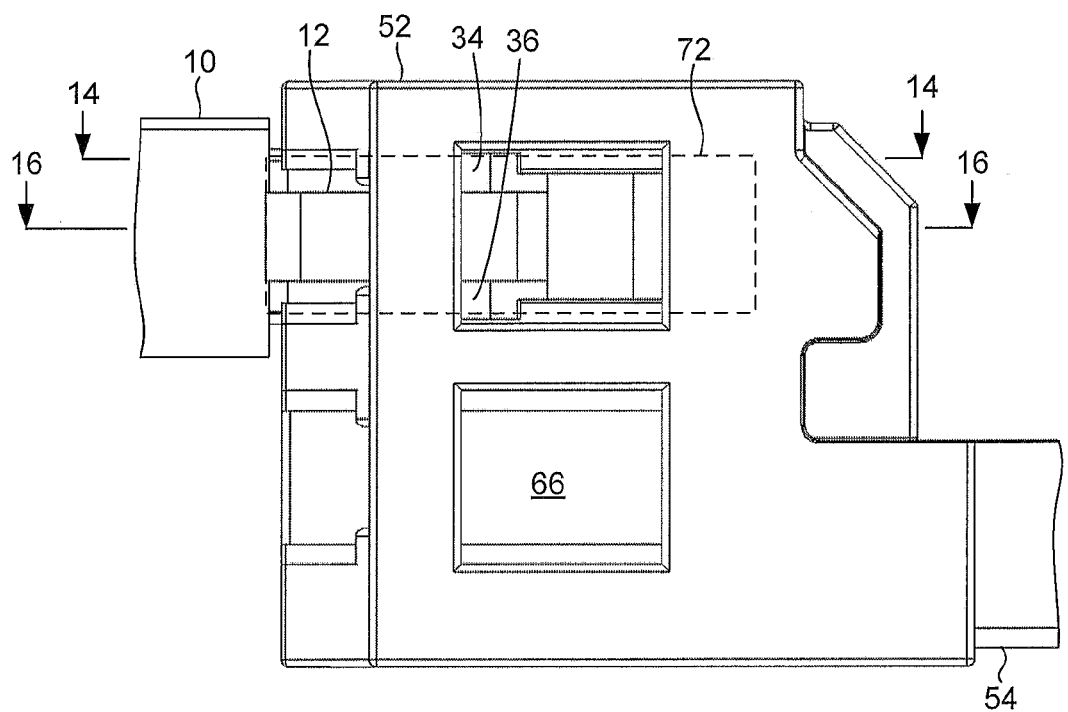
FIG. 12 is similar to FIG. 11, showing the LC connector plug of FIGS. 1-2 latched in the module nose.

Also, although stop member 88 is not captured in the cross section of wall 86 shown in FIG. 10, it should be understood from the descriptions above that the portion of wall 86 that defines stop member 88 extends into latchway 72. Stop member 88 is, however, captured in the cross section of wall 86 shown in FIG. 16. Stop member 88 is also shown in FIGS. 11 and 13 in relation to latchway 72 of receptacle 62.

Figure 14:
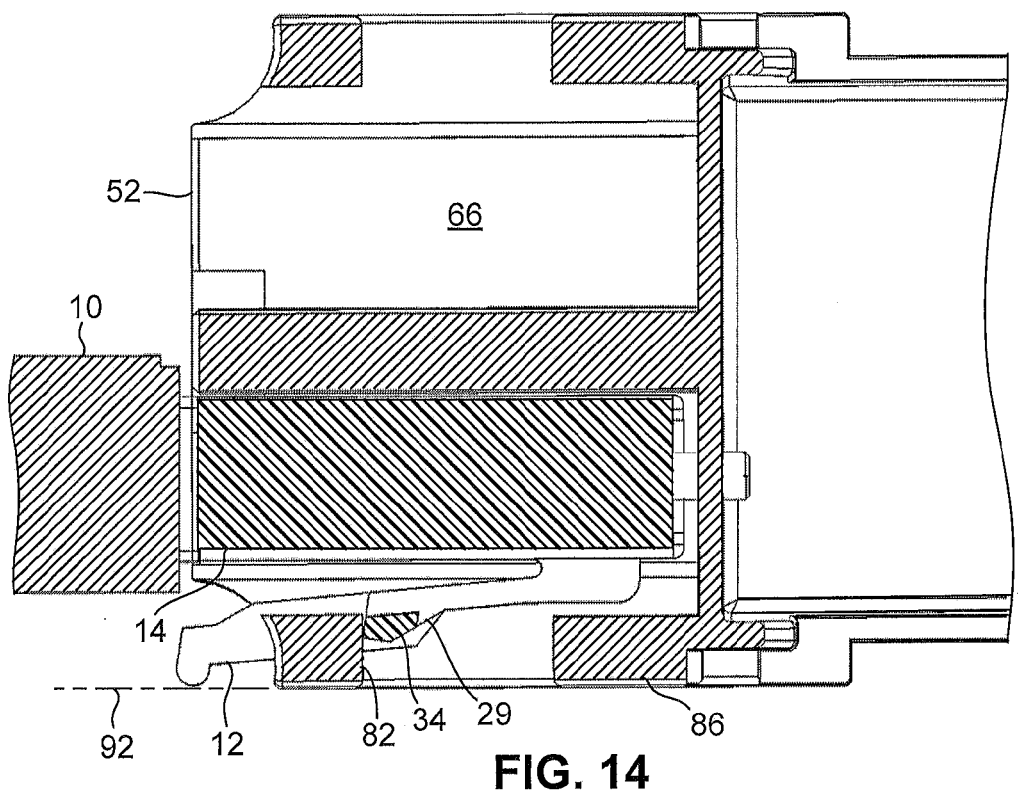
FIG. 14 is a sectional view taken on line 14-14 of FIG. 12.

In FIG. 14, latch arm 12 is shown in a latched state. In the latched state, blocks 34 and 36 abut catches 82 and 84, respectively. This latching engagement, in which blocks 34 and 36 abut and bear against catches 82 and 84, resists LC plug 10 from being withdrawn from receptacle 62. Note that when latch arm 12 is in the latched state, latch arm 12 is also in the above-referenced state between fully flexed and fully relaxed, i.e., partly relaxed and partly flexed. Thus, latch arm 12 is movable or flexible through a range of movement between the fully flexed state and the latched state.

Figure 16:
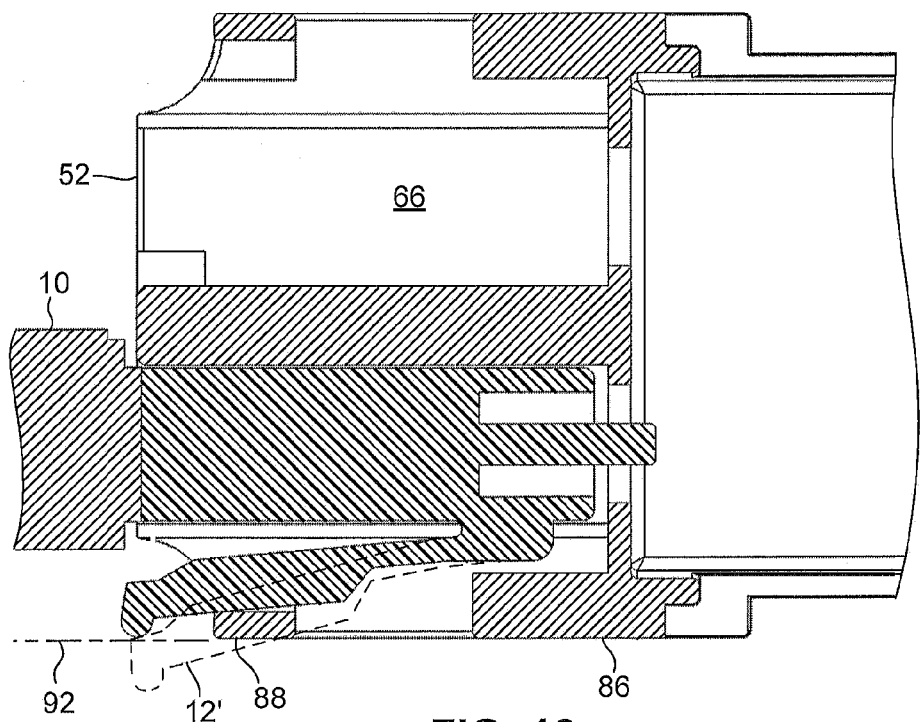
FIG. 16 is a sectional view taken on line 16-16 of FIG. 12.

As further illustrated in FIG. 16, when latch arm 12 is in the latched state, stop member 88 restrains latch arm 12 from moving through a plane 92 that is co-planar with the exterior surface of wall 86. No portion of latch arm 12 intersects plane 92. Plane 92 defines a portion of the outline of optical transceiver module 50. Thus, stop member 88 maintains latch arm 12 within the outline of optical transceiver module 50, thereby providing optical transceiver module 50 with a low profile. In a system (not shown) in which multiple transceiver modules 50 are positioned side by side with each other, the spacing or pitch between adjacent transceiver modules 50 can be nearly as small as the width of each transceiver module 50 because latch arms 12 of adjacent transceiver modules 50 would not interfere with one another. In FIG. 16, a latch arm fully relaxed position 12' (indicated in broken line) represents the position that latch arm 12 would reach in a fully relaxed state if stop member 88 were not present.

Figure 15:
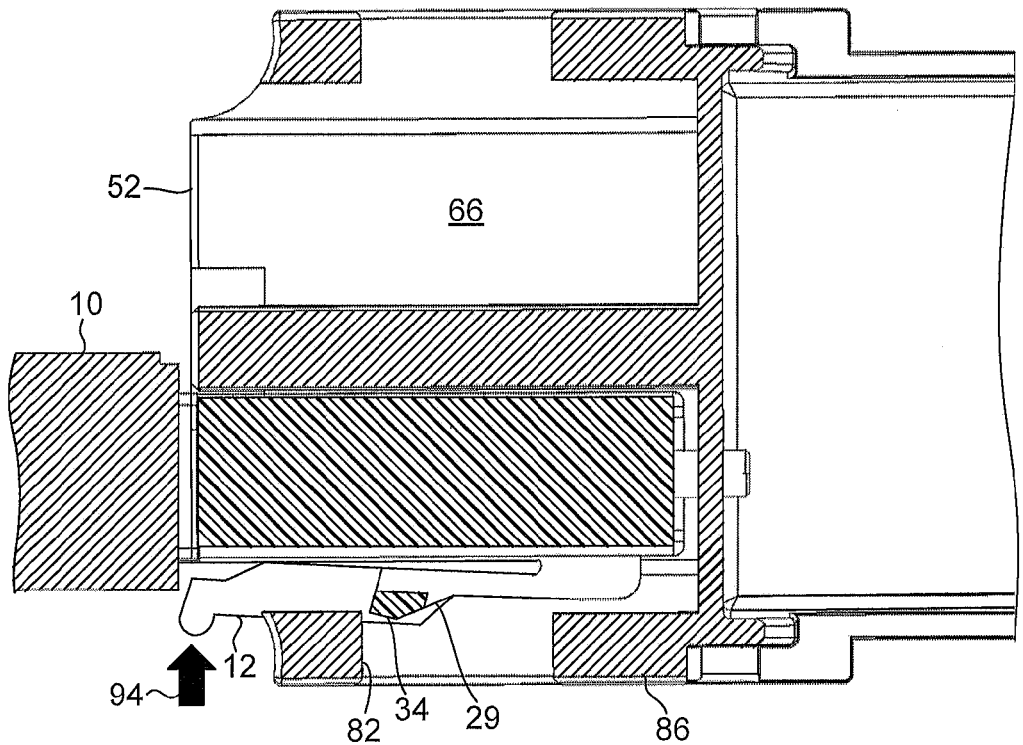
FIG. 15 is similar to FIG. 14, showing the latch arm of the LC connector plug in an unlatched state.

As illustrated in FIG. 15, to disengage or de-latch LC plug 10 from receptacle 62, a person (not shown) can apply a force to latch arm 12 having a component generally in the direction of the arrow 94. The force flexes latch arm 12 as described above, thereby unseating blocks 34 and 36 from their latching engagement with catches 82 and 84. Once LC plug 10 has been de-latched in this manner, the person can withdraw (i.e., un-plug) LC plug 10 from receptacle 62.

Figure 17:
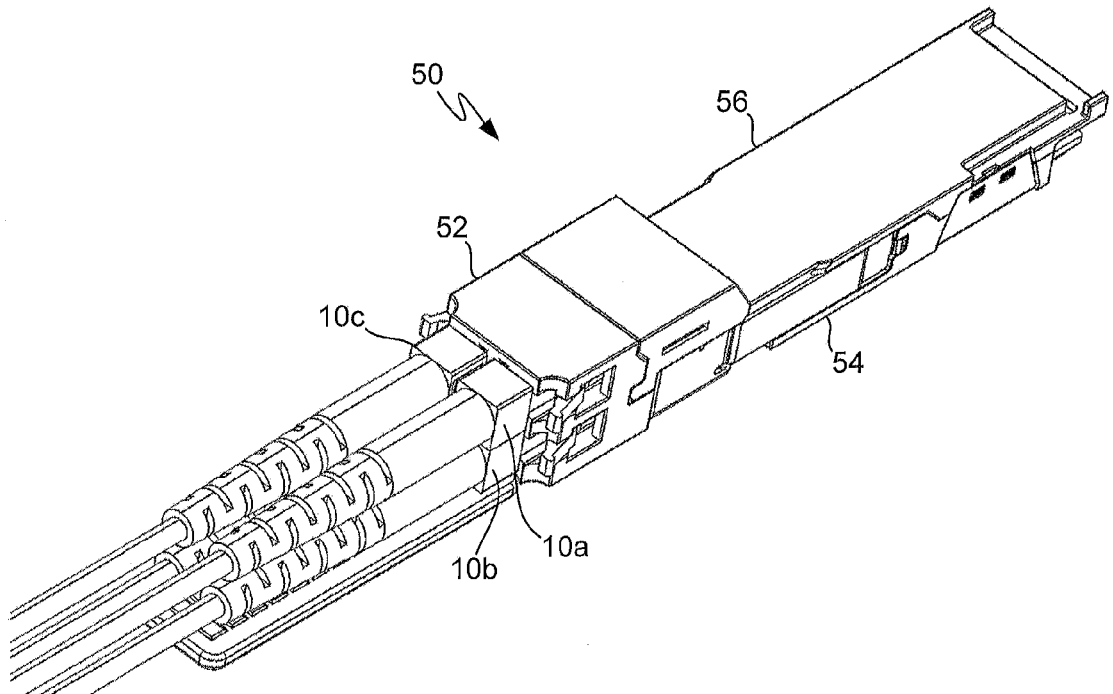
FIG. 17 is similar to FIG. 7, showing four LC connector plugs plugged into the optical transceiver module.

Although for purposes of clarity only a single LC plug 10 is described above with regard to the exemplary embodiment, it should be understood that optical transceiver module 50 can receive up to four LC plugs 10, as illustrated in FIG. 17, where each LC plug 10 (which, for convenience of illustration, can be separately referenced as LC plug 10a, LC plug 10b, LC plug 10c, etc.), is plugged into corresponding one of receptacles 62-68 in the same manner described above with regard to the example involving receptacle 62. Also, although in the exemplary embodiment optical transceiver module 50 has a QSFP configuration, such that it can receive up to four LC plugs 10, in other embodiments an optical transceiver module in accordance with the present invention can have any other suitable configuration and receive any other suitable number and type of optical connector plugs.

One or more illustrative embodiments of the invention have been described above. However, it is to be understood that the invention is defined by the appended claims and is not limited to the specific embodiments described.

What is claimed is:

1. An optical communications module having a housing for receiving an optical connector plug, comprising:
    a receptacle having a keyway and a latchway, the keyway configured to slideably receive and guide a body of the optical connector plug in a direction along a keyway axis, the latchway defined by a total flexure range of a flexible latch arm of the optical connector plug between a fully flexed state and a fully relaxed state, the latchway configured to receive and guide a portion of the flexible latch arm through a range of movement having a directional component perpendicular to the keyway axis; and
    a stop member extending from a wall of the receptacle into the latchway, the stop member configured to restrain the flexible latch arm in a latched state between the fully flexed state and the fully relaxed state, the optical connector plug resisting removal from the receptacle when the flexible latch arm is in the latched state.

2. The optical communications module of claim 1, wherein the stop member extends completely through the latchway.

3. The optical communications module of claim 1, wherein the stop member restrains the latch arm from intersecting a plane of an exterior wall of the receptacle.

4. The optical communications module of claim 1, wherein an exterior surface of the stop member is coextensive with an exterior of a wall of the receptacle.

5. The optical communications module of claim 1, wherein an interior surface of the stop member defines a portion of a channel configured to slideably receive and guide the portion of the flexible latch arm in the direction along the keyway axis.

6. The optical communications module of claim 5, wherein a pair of catches at an end of the channel are configured to engage a pair of blocks on the flexible latch arm in a latched state.

7. The optical communications module of claim 1, wherein the stop member is located at a forward edge of the receptacle.

8. The optical communications module of claim 1, wherein the optical communications module housing has an elongated bar-shaped housing portion, and the receptacle is located at a forward end of the optical communications module housing.

9. The optical communications module of claim 8, wherein the receptacle is defined by a cavity in a metal housing nose at the forward end of the optical communications module housing.

10. The optical communications module of claim 8, wherein a rearward end of the optical communications module includes an array of pluggable electrical signal contacts.

11. The optical communications module of claim 1, wherein the optical connector plug has an LC configuration.

12. The optical communications module of claim 1, wherein the optical communications module housing has an SFP-family configuration.

13. The optical communications module of claim 1, wherein optical signals are both transmitted and received.

14. The optical communications module of claim 1, wherein the optical communications module includes a plurality of the receptacles.

15. The optical communications module of claim 14, wherein the optical communications module includes four receptacles.

16. An optical communications module having a housing for receiving an optical connector plug, comprising:
    a receptacle having a keyway and a latchway, the keyway configured to slideably receive and guide a body of the optical connector plug in a direction along a keyway axis, the latchway defined by a total flexure range of a flexible latch arm of the optical connector plug between a fully flexed state and a fully relaxed state, the latchway configured to receive and guide a portion of the flexible latch arm through a range of movement having a directional component perpendicular to the keyway axis; and
    a stop member extending from a wall of the receptacle into the latchway, the stop member configured to restrain the flexible latch arm in a latched state between the fully flexed state and the fully relaxed state, the optical connector plug resisting removal from the receptacle when the flexible latch arm is in the latched state, wherein the stop member extends completely through the latchway and restrains the latch arm from intersecting a plane of an exterior wall of the receptacle.

17. The optical communications module of claim 16, wherein an interior surface of the stop member defines a portion of a channel configured to slideably receive and guide the portion of the flexible latch arm in the direction along the keyway axis.

18. The optical communications module of claim 17, wherein a pair of catches at an end of the channel are configured to engage a pair of blocks on the flexible latch arm in a latched state.

19. The optical communications module of claim 16, wherein the stop member is located at a forward edge of the receptacle.

20. The optical communications module of claim 16, wherein:
    the optical connector plug has an LC configuration; and
    the optical communications module housing has an SFP-family configuration.

* * * * *